United States Patent
Alameh et al.

(10) Patent No.: US 10,516,430 B1
(45) Date of Patent: *Dec. 24, 2019

(54) MILLIMETER WAVE ANTENNA MANAGEMENT

(71) Applicant: Motorola Mobility LLC, Chicago, IL (US)

(72) Inventors: Rachid Alameh, Chicago, IL (US); Eric Krenz, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/425,467

(22) Filed: May 29, 2019

Related U.S. Application Data

(63) Continuation of application No. 16/112,311, filed on Aug. 24, 2018, now Pat. No. 10,404,308.

(51) Int. Cl.
| | |
|---|---|
| *H04B 1/3827* | (2015.01) |
| *H01Q 1/24* | (2006.01) |
| *H04M 1/02* | (2006.01) |
| *H04W 52/24* | (2009.01) |
| *H04W 52/30* | (2009.01) |

(52) U.S. Cl.
CPC ........... *H04B 1/3838* (2013.01); *H01Q 1/245* (2013.01); *H04M 1/026* (2013.01); *H04M 2250/12* (2013.01); *H04W 52/243* (2013.01); *H04W 52/30* (2013.01)

(58) Field of Classification Search
CPC ............... H04B 1/3838; H04M 1/026; H04M 2250/12; H01Q 1/245; H04W 52/243; H04W 52/30
USPC ................ 455/414.1, 418, 456.1, 550.1, 571
See application file for complete search history.

(56) References Cited

U.S. PATENT DOCUMENTS

| | | | |
|---|---|---|---|
| 2008/0051165 A1* | 2/2008 | Burgan ............... | H04W 52/283 455/575.6 |
| 2012/0071203 A1* | 3/2012 | Wong .................... | H01Q 1/243 455/550.1 |
| 2013/0328723 A1* | 12/2013 | Rappaport .......... | H04B 1/3838 342/372 |
| 2015/0333788 A1* | 11/2015 | Ding .................... | H04B 1/3838 455/575.5 |
| 2017/0195004 A1* | 7/2017 | Cheng ................. | H04B 7/0602 |

* cited by examiner

*Primary Examiner* — Michael Y Mapa
(74) *Attorney, Agent, or Firm* — McKinney Phillips LLC; Phillip Pippenger

(57) ABSTRACT

A mobile electronic communications device performs millimeter wave antenna management for one of a plurality of mm-wave antennas by determining via a sensor array whether a human presence exists at the one of the mm-wave antennas and determining whether one or more others of the plurality of mm-wave antennas on the device are in use, or enabled. The mm-wave antenna of in question is managed by selectively enabling or disabling it based on the above determination.

16 Claims, 5 Drawing Sheets

MILLIMETER WAVE ANTENNA MANAGEMENT

RELATED APPLICATION

This application is a continuation of U.S. application Ser. No. 16/112,311 filed on Aug. 24, 2018, titled Millimeter Wave Antenna Management, which is herein incorporated by reference for all that it teaches without exclusion of any part or portion thereof.

TECHNICAL FIELD

The present disclosure is related generally to mobile electronic communications devices and, more particularly, to systems and methods for activating and deactivating one or more millimeter wave antennas associated with a mobile electronic communications device.

BACKGROUND

As mobile communications technologies have advanced, consumers have been able to take advantage of 1G, 2G, 3G, 4G LTE, and, now, 5G data rates. 1G established mobile connectivity and introduced mobile voice services while 2G increased voice capacity. 3G added enhancements for mobile data (mobile broadband services) and 4G LTE enabled higher capacity to improve the mobile broadband experience.

Now 5G (5th Generation) integrates mm-wave access into current cellular networks to leverage the ultra-wideband characteristics of the mm-wave band. Since mm-wave signals may interfere with, or be interfered with by, human tissue, the inventors desire to provide a mechanism for activating and deactivating one or more mm-wave antennas on a mobile device.

Before proceeding to the remainder of this disclosure, it should be appreciated that the disclosure may address some or all of the shortcomings listed or implicit in this Background section. However, any such benefit is not a limitation on the scope of the disclosed principles, or of the attached claims, except to the extent expressly noted in the claims.

Additionally, the discussion of technology in this Background section is reflective of the inventors' own observations, considerations, and thoughts, and is in no way intended to be, to accurately catalog, or to comprehensively summarize any prior art reference or practice. As such, the inventors expressly disclaim this section as admitted or assumed prior art. Moreover, the identification or implication herein of one or more desirable courses of action reflects the inventors' own observations and ideas, and should not be assumed to indicate an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
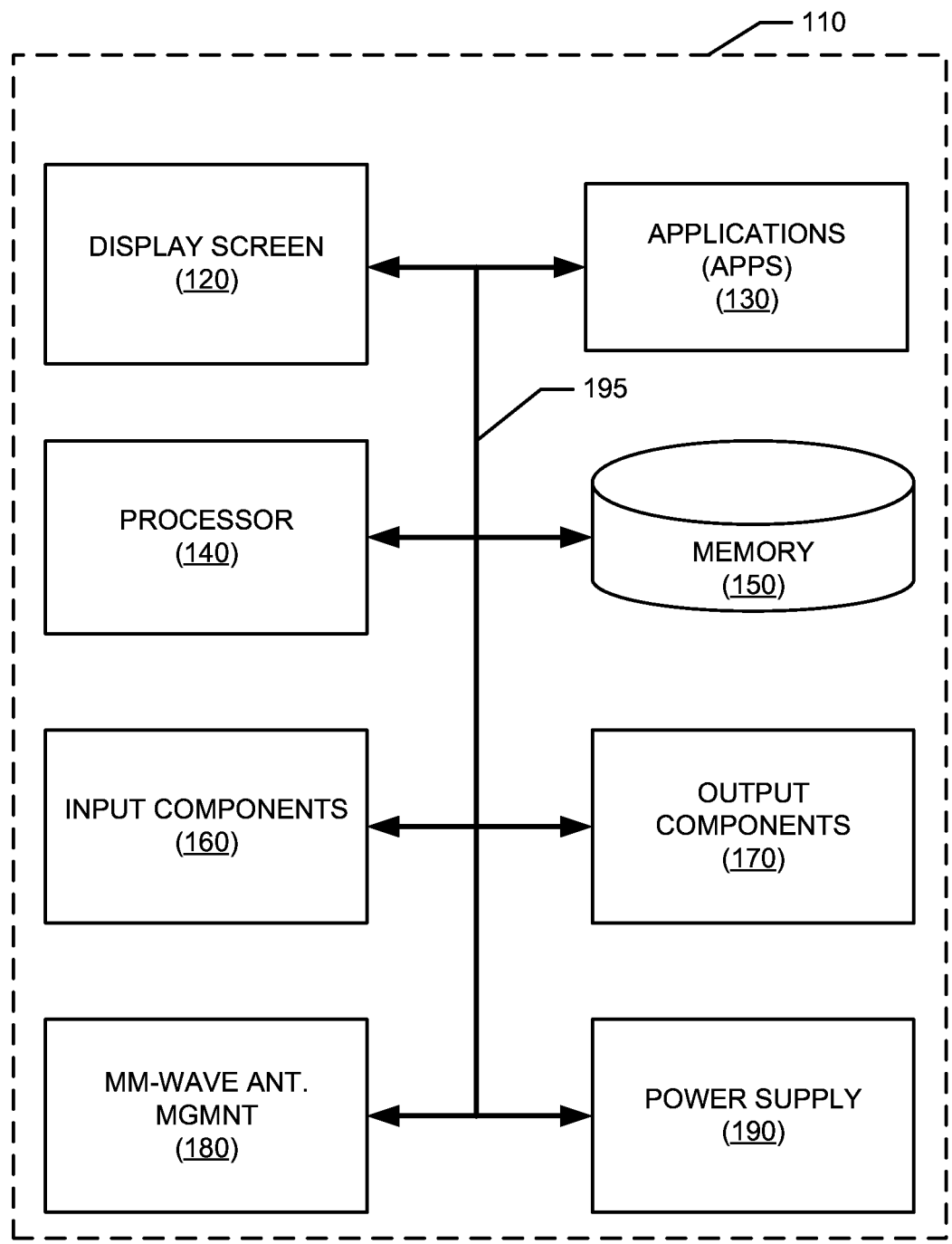
FIG. 1 is a general schematic representation of a mobile electronic device in which various embodiments of the disclosed principles may be implemented.

Before presenting a detailed discussion of embodiments of the disclosed principles, an overview of certain embodiments is given to aid the reader in understanding the later discussion. As noted above, 5G employs mm-wave to achieve ultra-wideband characteristics. However, because mm-wave signals may interfere with, or be interfered with by, human tissue, a reliable and efficient mechanism for activating and deactivating one or more mm-wave antennas on a mobile device is needed.

In an embodiment of the disclosed principles, a mobile communications device employs a plurality of mm-wave antennas with one or more of these antennas being associated with one or both of a thermal sensor and a capacitive sensor. Within such a device, when sensor states and baselines are initialized, it is not yet known which sensors may be obscured by a human, if any. For example, a temperature sensor that initializes at 70 degrees Celsius may be reading a human hand or just an ambient temperature.

The characteristics of human motion allow for a resolution of this dilemma in an embodiment. In particular, a positive or negative temperature change, having a rate of change consistent with human motion is used to identify a potential human contact or presence. If no such motion is detected, the device uses data in its filter algorithm to update the local baseline for that sensor.

However, if such motion is detected, the magnitude of the temperature change is then analyzed to determine if the magnitude is large enough to be consistent with motion within the detection distance (e.g., 10 cm). When these criteria are met, indicating a likely human presence within the detection distance, the antenna associated with the thermal sensor is disabled and its baseline value is frozen to avoid having the baseline track out the human presence. As an alternative to freezing the baseline, the device may continue to adjust based on a global baseline in an embodiment, the global baseline being derived from averaging the values of the other sensors.

With respect to releasing, i.e., unfreezing, the baseline of a thermal sensor and enabling the associated mm-wave antenna, human motion is again used as a trigger. If a change of slope is detected that is consistent with human motion within the detection zone, further steps are taken in an embodiment to determine whether the sensor is to be released. In particular, human motion away from the sensor (temperature moving back toward baseline) may be used in this embodiment as a prerequisite for release. The system may analyze and consider whether the user move entirely out of the detection zone and whether the temperature decrease matches the original change for example. Tracked changes can be recorded or simply compared to the original or global baseline.

With this overview in mind, and turning now to a more detailed discussion in conjunction with the attached figures, the techniques of the present disclosure are illustrated as being implemented in or via a suitable device environment.

The following device description is based on embodiments and examples within which or via which the disclosed principles may be implemented, and should not be taken as limiting the claims with regard to alternative embodiments that are not explicitly described herein.

Thus, for example, while FIG. 1 illustrates an example mobile electronic communications device with respect to which embodiments of the disclosed principles may be implemented, it will be appreciated that other device types may be used, including but not limited to laptop computers, tablet computers, and so on. It will be appreciated that additional or alternative components may be used in a given implementation depending upon user preference, component availability, price point and other considerations.

In the illustrated embodiment, the components of the user device 110 include a display screen 120, applications (e.g., programs) 130, a processor 140, a memory 150, one or more input components 160 such as RF input facilities or wired input facilities, including, for example one or more antennas and associated circuitry and logic. The antennas and associated circuitry may support any number of protocols, e.g., WiFi, Bluetooth, different generations of cellular service including 5G, etc.

The device 110 as illustrated also includes one or more output components 170 such as RF (radio frequency) or wired output facilities. The RF output facilities may similarly support any number of protocols, e.g., WiFi, Bluetooth, cellular including 5G, etc., and may be the same as or overlapping with the associated input facilities. It will be appreciated that a single physical input may serve for both transmission and receipt.

The processor 140 can be a microprocessor, microcomputer, application-specific integrated circuit, or other suitable integrated circuit. For example, the processor 140 can be implemented via one or more microprocessors or controllers from any desired family or manufacturer. Similarly, the memory 150 is a nontransitory media that may (but need not) reside on the same integrated circuit as the processor 140. Additionally or alternatively, the memory 150 may be accessed via a network, e.g., via cloud-based storage. The memory 150 may include a random access memory (i.e., Synchronous Dynamic Random Access Memory (SDRAM), Dynamic Random Access Memory (DRAM), RAMBUS Dynamic Random Access Memory (RDRM) or any other type of random access memory device or system). Additionally or alternatively, the memory 150 may include a read-only memory (i.e., a hard drive, flash memory or any other desired type of memory device).

The information that is stored by the memory 150 can include program code (e.g., applications 130) associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

Further with respect to the applications and modules, these typically utilize the operating system to provide more specific functionality, such as file system service and handling of protected and unprotected data stored in the memory 150. In an embodiment, modules are software agents that include or interact with hardware components such as one or more sensors, and that manage the device 110's operations and interactions with respect to the described embodiments.

With respect to informational data, e.g., program parameters and process data, this non-executable information can be referenced, manipulated, or written by the operating system or an application. Such informational data can include, for example, data that are preprogrammed into the device during manufacture, data that are created by the device or added by the user, or any of a variety of types of information that are uploaded to, downloaded from, or otherwise accessed at servers or other devices with which the device is in communication during its ongoing operation.

In an embodiment, a mm-wave management module 180 executes process for antenna management as described hereinafter. The mm-wave management module 180 may be represented in the device 110 as code executed by the processor 140 of the device 110, wherein the code comprises computer-executable instructions read from a non-transitory computer readable medium.

In an embodiment, a power supply 190, such as a battery or fuel cell, is included for providing power to the device 110 and its components. Additionally or alternatively, the device 110 may be externally powered, e.g., by a vehicle battery, wall socket or other power source. In the illustrated example, all or some of the internal components communicate with one another by way of one or more shared or dedicated internal communication links 195, such as an internal bus.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data and toggling through various graphical user interface objects (e.g., toggling through various display icons that are linked to executable applications). As noted above, the device 110 may include one or more display screens 120. These may include one or both of an integrated display and an external display.

In an embodiment, the input 160 and output 170 components include a plurality of mm-wave antennas, and at least one sensor array collocated with multiple of the mm-wave antennas. The sensor arrays include a capacitive sensor and a thermal sensor. The device may also include as one of the input components 160 one or more accelerometers or other inertial sensors and may also include other location or movement sensors.

Figure 2:
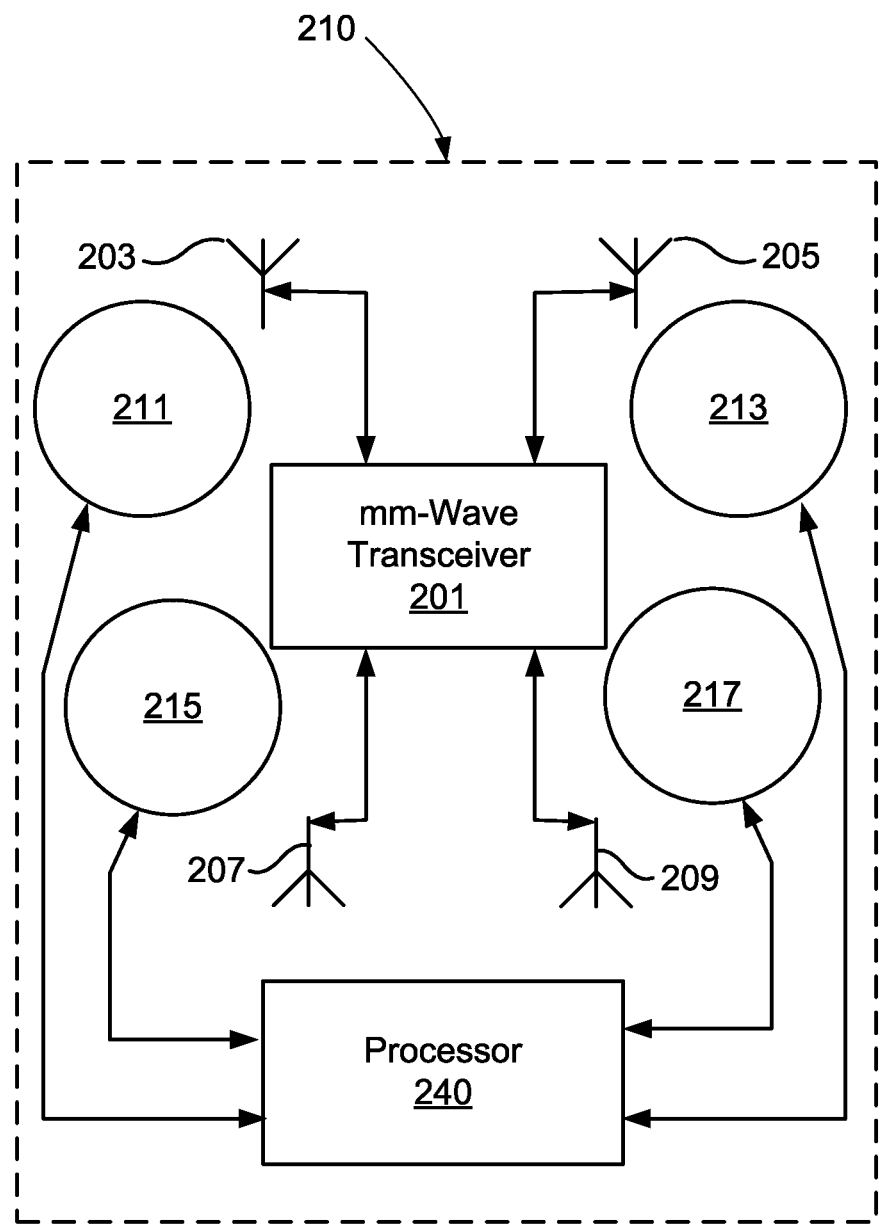
FIG. 2 is a schematic view of a device as in FIG. 1, showing mm-wave antennas and associated sensor arrays.

FIG. 2 is a schematic view of the device 110 of FIG. 1, showing in greater detail the mm-wave antennas and the associated sensor arrays. In the illustrated embodiment, the device 210 (110) includes a mm-wave transceiver 201. The transceiver 201 is selectively linked to each of four mm-wave antennas 203, 205, 207, 209.

The device 210 (110) similarly includes a respective sensor array 211, 213, 215, 217 collocated with each of the four mm-wave antennas 203, 205, 207, 209, such that each sensor array 211, 213, 215, 217 is able to sense temperature and capacitance at or within the detection distance of the associated antenna 203, 205, 207, 209. A device processor 240 (140 of FIG. 1) monitors sensor array 211, 213, 215, 217 in order to execute the techniques and processes described herein.

Figure 3:
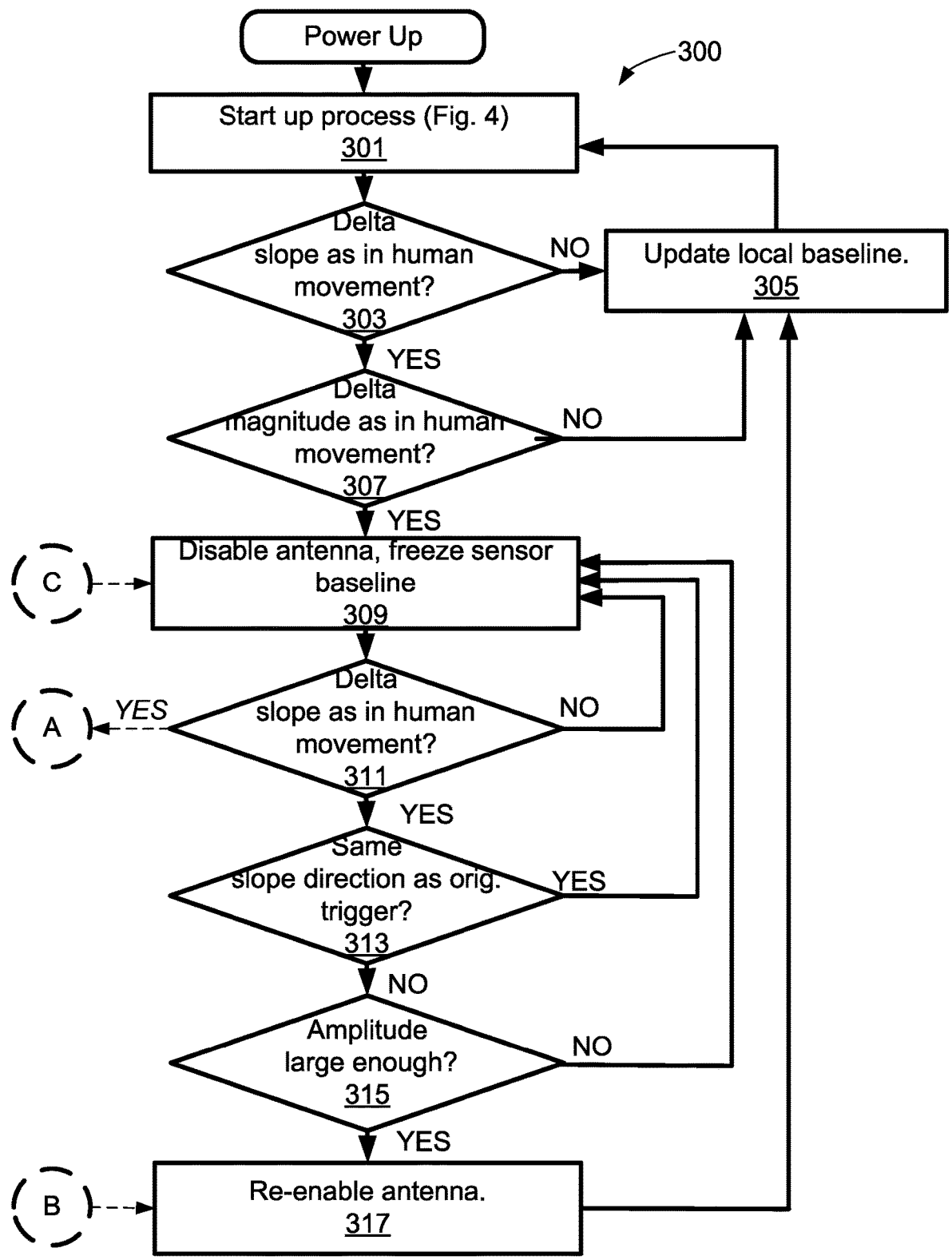
FIG. 3 is a flow chart showing a process of mm-wave antenna management in accordance with an embodiment of the disclosed principles.

Turning to FIG. 3, this figure shows a flow chart of a process 300 by which the device 110 (210) operates in accordance with an embodiments of the disclosed principles.

The executing or host device is assumed to be like or similar to that shown in FIGS. 1 and 2, although it will be appreciated that other types of mobile communication devices may be suitable as well when properly configured. Moreover, the process 300 is described as it pertains to a single sensor array and associated antenna, but it should be appreciated that the process 300 is executed for each array and antenna, whether executed serially or in parallel.

Figure 4:
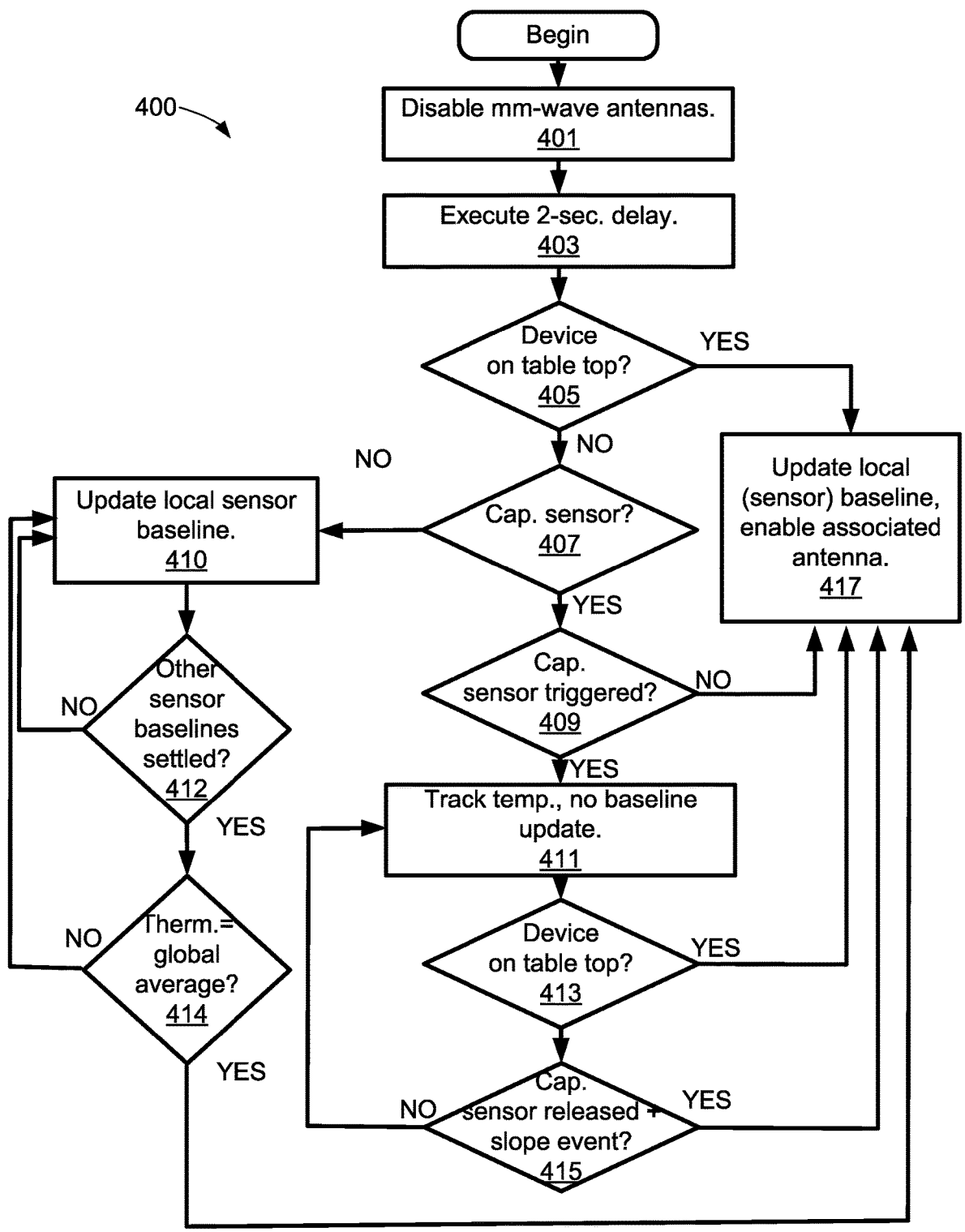
FIG. 4 is a flow chart showing a startup process within the mm-wave antenna management process of FIG. 3 in accordance with an embodiment of the disclosed principles.

At stage 301 of the process 300, the device performs a start-up algorithm, which will be discussed in greater detail later with reference to FIG. 4. Subsequent to startup, the process 300 flows to stage 303, wherein the device determines whether a thermal signal is detected with a slope (temporal thermal gradient) that is consistent with human motion. For example, a very gradual change may simply correspond to a change in ambient air rather than being representative of a human movement.

If no such movement is detected at stage 303, then the process 300 flows to stage 305, wherein the device updates the local (sensor) baseline and returns to stage 303. Otherwise, if qualifying movement was detected at stage 303, the process 300 flows to stage 307, wherein the device determines if the change in magnitude (thermal change magnitude) of the detected thermal signal is large enough to be consistent with motion within the detection distance. If not, the process 300 flows to stage 305. Otherwise, the process 300 flows to stage 309, wherein the device disables the associated mm-wave antenna and freezes the sensor baseline. The represents a determination that there is likely to be human tissue within the detection distance of the antenna in question.

Subsequently at stage 311, the device determines whether there another change of slope in the thermal signal that is consistent with human movement. If not, the process 300 returns to stage 309. Otherwise, the process flows to stage 313 wherein the device determines whether the detected signal slope matches, within a predetermined tolerance, the initially-detected slope (from stage 303).

If the slopes match within the predetermined tolerance, the process returns to stage 309. Otherwise, the process 300 moves to stage 315, wherein the device determines whether the change in magnitude of the detected thermal signal is similar to (e.g., within a predetermined tolerance of) the originally-detected change in magnitude. If not, the process returns to stage 309. Otherwise, the process 300 moves to stage 317, wherein the associated antenna is re-enabled and the process returns to stage 305.

As noted above, the mobile communications device 110 (210) performs a start-up algorithm at the outset of the process 300. Turning to FIG. 4, this startup algorithm is shown in greater detail. At stage 401 of the process 400, the device disables the plurality of mm-wave antennas on the device and then moves to stage 403 which provides a 2-second delay, e.g., to allow time for the user to remove his or her hand from the device.

The subsequent stages are executed for each antenna and associated sensor array, whether executed serially or in parallel. At stage 405, the device determines, e.g., via its accelerometer, whether the device is laying on a table top or other stationary surface. If so, the process 400 skips to stage 417, wherein it updates the sensor baseline and enables the associated antenna. Otherwise, the process 400 flows to stage 407, wherein, if the device has a capacitive sensor collocated with the antenna of interest, the process flows to stage 409. Otherwise the process continues to stage 410.

At stage 409, it is determined if the capacitive sensor has been triggered. If not, the process 400 flows to stage 417, but otherwise flows to stage 411, wherein the device tracks the temperature sensor readings but does not update the sensor baseline. Subsequently at stage 413, whether the device is still laying on the table top or other stationary surface. If so, the process 400 flows to stage 417. Otherwise, the process flows to stage 415, wherein the device determines whether the capacitive sensor has been released (i.e., no longer triggered) and there has been a thermal slope event, as described above, indicative of human movement. If both criteria are met, the process 400 flows to stage 417. Otherwise, the process 400 returns to stage 411.

Returning to stage 407 and continuing at stage 410, that is, if the thermal sensor does not have a capacitive sensor associated with it, the device updates the local (sensor) baseline. Subsequently at stage 412, the device determines whether other local (sensor) baselines relative to the other thermal sensors associated with other antennas have settled. If not, the process returns to stage 410, but otherwise the process 400 flows to stage 414, wherein the device determines whether the current thermal sensor reading matches the global (device-wide) average for the other thermal sensors within a predetermined tolerance. If not, the process 400 returns to stage 410, but otherwise the process 400 flows to stage 417 to update the local (sensor) baseline and enable the associated antenna.

As a result of this process, 400, combined with process 300, one or more mm-wave antennas may be disabled at any given moment (device may operate using LTE until mm-wave is again available), with the other antennas remaining active. Further, one of the active antennas may then be selected for use or, in an embodiment, the active antennas may be multiplexed if desired. Regardless, exposure to mm-wave radiation is managed to remain within acceptable ranges while allowing as much use of the mm-wave antenna system as possible.

In a further embodiment, one or more antennas may be throttled, or used at a decreased power setting, rather than disabled if doing so allows radiated power density limits to be observed. Similarly, beam steering rather than disabling may be used to avoid detected human tissue, if doing so still allows radiated power density limits to be observed.

Figure 5:
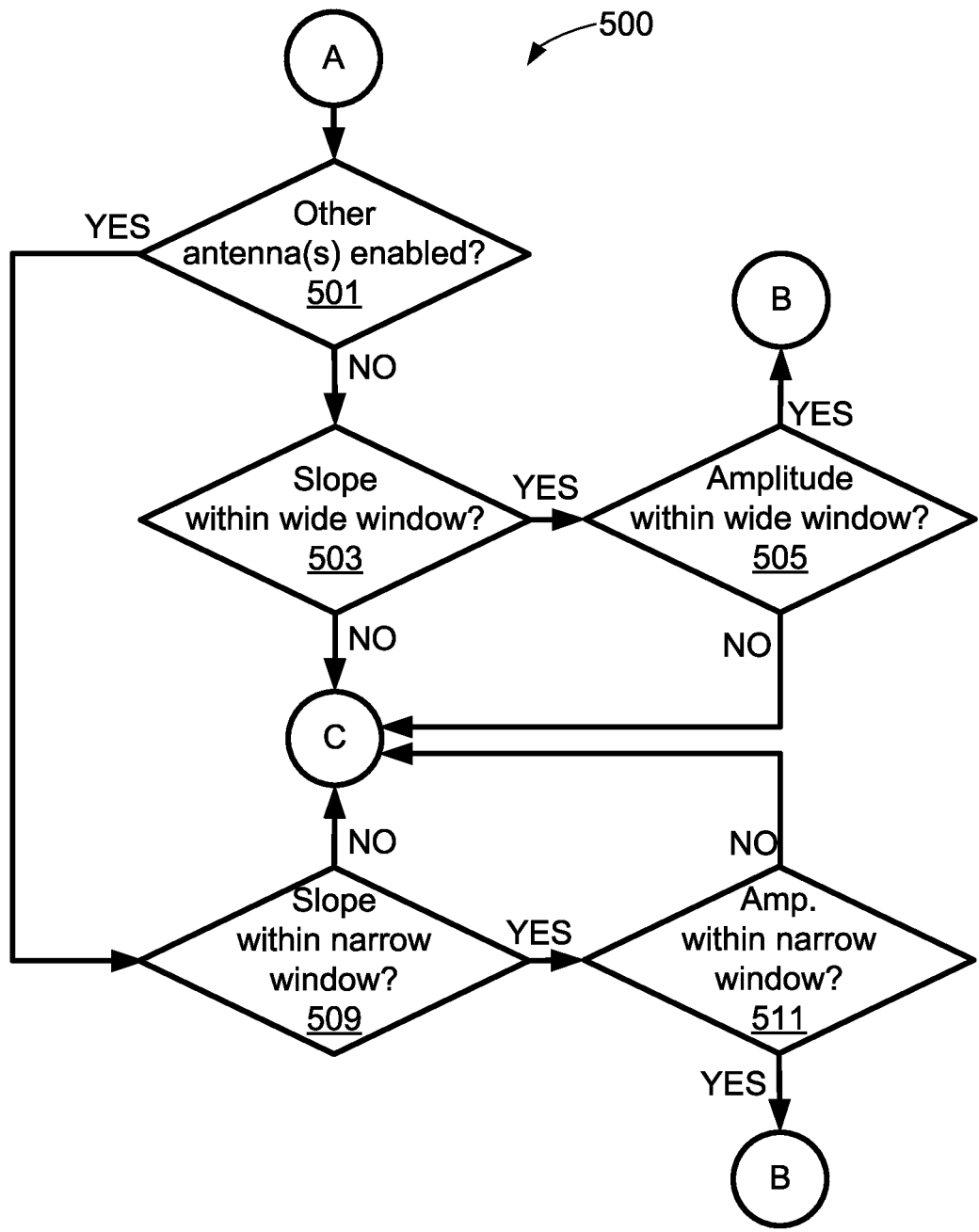
FIG. 5 is a flow chart showing an alternative process of mm-wave antenna management in accordance with an embodiment of the disclosed principles.

In an alternative embodiment of the process 300 of FIG. 3, the device may instead take the state of other device antennas into account in making enablement or disablement decisions regarding a specific antenna of interest. FIG. 5 is a flow chart showing an example of this alternative process 500 of mm-wave antenna management.

The process 500 incorporates the first portion of process 300, but departs after stage 311 of process 300. In particular, if it is determined at stage 311 of process 300 that there is another change of slope in the thermal signal that is consistent with human movement, route A is taken, providing entry to process 500 of FIG. 5.

At stage 501 of process 500, the device determines whether one or more other mm-wave antennas on the device are enabled. If it is determined at stage 501 that one or more other mm-wave antennas on the device are enabled, the process 500 flows to stage 509, which will be discussed below. If instead it is determined at stage 501 that no other mm-wave antenna on the device is enabled, the process 500 flows to stage 503, wherein the device determines whether the detected slope from FIG. 3, stage 311 is within a wide window. With respect to direction, a slope indicating that sensor temperature is moving back toward baseline is consistent with user movement away from the sensor.

Herein, the term "wide" refers to a less restrictive matching of slope and amplitude change to be indicative of a person un-touching the device, e.g., opposite in direction from the values detected when touching the device, but not necessarily matching the absolute levels for slope and amplitude. In other words, when other mm-wave antennas are not available, there is a greater need to re-enable the current antenna, and hence lower thresholds or looser tolerances are used. For antenna release, this provides a more tolerant decision window. In other words, the decision to re-enable the antenna when the associated sensor is released is taken with a lower required confidence that the sensor is actually being untouched. One justification for the wider window is that, in this situation, there are no other antennas available.

If at stage 503 it is determined that the detected slope from FIG. 3, stage 311 is not within the wide window, then the process 500 flows to stage 309 of process 300 via link C. Otherwise, the process 500 flows to stage 505, wherein the device determines whether the detected thermal signal amplitude (from process 300 stage 315 for example) also fits within a wide window. If not, the process 500 flows to link C. Otherwise, the process 500 flows to stage 309 of process 300 via link B.

Returning to stage 501, if it is determined at this stage that one or more other mm-wave antennas on the device are enabled, the process 500 flows to stage 509, as discussed above. At stage 509, the process 500 determines whether the detected slope is within a narrow window (strict window, higher threshold, high level of confidence that antenna has indeed been released). As used herein, a narrow window entails a more strict amplitude and slope profile match threshold than a wide window, enforcing higher confidence that the user's finger has indeed been removed from the sensor and associated antenna.

A delay may also be implemented in order to accumulate a greater number of thermal samples. This will generally enable a higher-confidence decision, based on the affected area of the device reaching a steady-state temperature. The stricter limit and delay before re-enabling the antenna are reasonable since there are other antennas enabled, as was determined at stage 501.

If it is determined at stage 509 that the detected slope is within the narrow window, then the process moves on to stage 511, wherein it is determined whether the thermal signal amplitude is within the narrow window, e.g., is a close match to the original change amplitude. This would be the case, for example, if the user moves entirely out of the detection zone. The device may keep a record of thermal changes, or the change may be compared to the original temperature or global baseline across all sensors.

If the thermal signal amplitude is within the narrow window, the process 500 flows to stage 317 of process 300 via link B. Otherwise, the process 500 flows to stage 309 of process 300 via link C. Similarly, if at stage 509 it is instead determined that the detected slope is not within the narrow window, then the process flows to stage 309 of process 300 via link C, wherein the device disables the associated mm-wave antenna and freezes the sensor baseline before proceeding.

In this way, the existence and state of other mm-wave antennas on the device may be taken into account in enabling or disabling another mm-wave antenna on the device. This enables the device to provide a more robust user experience with respect to mm-wave communications while still minimizing the mm-wave exposure of the user.

It will be appreciated that various systems and processes have been disclosed herein. However, in view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A mobile electronic communications device having millimeter-wave (mm-wave) antenna management, the mobile electronic communications device comprising:
 a plurality of mm-wave antennas on the device, including a first mm-wave antenna and one or more other mm-wave antennas;
 a sensor array associated with the first mm-wave antenna, the sensor array including at least one sensor, the at least one sensor having a detection range;
 a mm-wave transceiver configured to transmit via enabled ones the plurality of mm-wave antennas; and
 a processor configured to determine via the sensor array whether a human presence exists within the detection range and to determine whether any of the one or more other mm-wave antennas on the device are enabled, and to selectively enable and disable the first mm-wave antenna based on whether a human presence exists within the detection range and whether any of the one or more other mm-wave antennas on the device are enabled.

2. The mobile electronic communications device in accordance with claim 1, wherein the processor is further configured to selectively enable and disable the first mm-wave antenna by first disabling the first mm-wave antenna, and thereafter determining whether a human presence exists within the detection range, using a first confidence level if any of the one or more other mm-wave antennas is in use, and otherwise using a second confidence level, the second confidence level being lower than the first confidence level.

3. The mobile electronic communications device in accordance with claim 1, wherein enabling the first mm-wave antenna includes enabling the first mm-wave antenna at a reduced transmission power.

4. The mobile electronic communications device in accordance with claim 1, wherein enabling the first mm-wave antenna includes steering a transmission pattern associated with the first mm-wave antenna.

5. The mobile electronic communications device in accordance with claim 1, wherein selectively enabling and disabling the first mm-wave antenna includes:
 detecting a human presence within the detection range of the first mm-wave antenna via the thermal sensor;
 disabling the first mm-wave antenna and freezing a baseline of the sensor associated with the first mm-wave antenna;
 detecting that the detected human presence is no longer within the detection range; and
 enabling the first mm-wave antenna.

6. The mobile electronic communications device in accordance with claim 1, further comprising an inertial sensor and wherein the processor is further configured to confirm lack of human presence within the detection range via the inertial sensor by sensing that the mobile electronic communications device is lying in a flat position.

7. The mobile electronic communications device in accordance with claim 1, wherein the sensor array associated with the first mm-wave antenna includes a capacitive sensor.

8. A method for managing usage of a first millimeter-wave (mm-wave) on a mobile electronic communications device having a plurality of mm-wave antennas, the method comprising:
- detecting a change in capacitance near the first mm-wave antenna that is consistent with a human presence;
- determine whether one or more other mm-wave antennas on the device are in use and thereafter determining whether a human presence exists at the first mm-wave antenna by applying a first confidence level if one or more other mm-wave antennas on the device are in use, and otherwise applying a second confidence level, the second confidence level being lower than the first confidence level.

9. The method in accordance with claim 8, wherein determining whether a human presence exists at the first mm-wave antenna further includes determining via an inertial sensor whether the mobile electronic communications device is lying still and flat.

10. The method in accordance with claim 8, further comprising implementing a measurement period delay prior to determining whether a human presence exists at the first mm-wave antenna.

11. A mobile electronic communications device having millimeter-wave (mm-wave) antenna management, the mobile electronic communications device comprising:
- a plurality of mm-wave antennas on the device, including a first mm-wave antenna and one or more other mm-wave antennas;
- a sensor set including at least one of an inertial sensor and a capacitive sensor; and
- a processor configured to determine whether a human presence exists at the first mm-wave antenna using the sensor set, to determine whether any of the one or more other mm-wave antennas on the device are enabled, and to selectively enable and disable the first mm-wave antenna based on whether a human presence exists at the first mm-wave antenna and on whether any of the one or more other mm-wave antennas on the device are enabled.

12. The mobile electronic communications device in accordance with claim 11, wherein the processor is further configured to selectively enable and disable the first mm-wave antenna by using a first confidence level to determine whether a human presence exists at the first mm-wave antenna if any of the one or more other mm-wave antennas is in use, and otherwise by using a second confidence level to determine whether a human presence exists at the first mm-wave antenna, the second confidence level being lower than the first confidence level.

13. The mobile electronic communications device in accordance with claim 11, wherein enabling the first mm-wave antenna includes enabling the first mm-wave antenna at a reduced transmission power.

14. The mobile electronic communications device in accordance with claim 11, wherein enabling the first mm-wave antenna includes selectively steering a transmission pattern associated with the first mm-wave antenna.

15. The mobile electronic communications device in accordance with claim 11, wherein selectively enabling and disabling the first mm-wave antenna includes:
- detecting a human presence at the first mm-wave antenna;
- disabling the first mm-wave antenna;
- determining that the human presence is no longer detected at the first mm-wave antenna; and
- enabling the first mm-wave antenna.

16. The mobile electronic communications device in accordance with claim 11, wherein the sensor set includes the inertial sensor and wherein detecting a human presence at the first mm-wave antenna using the sensor set includes determining that the mobile electronic communications device is lying flat and still.

* * * * *